United States Patent [19]

Shellhammer et al.

[11] Patent Number: 5,523,552
[45] Date of Patent: Jun. 4, 1996

[54] METHOD AND APPARATUS TO SCAN RANDOMLY ORIENTED TWO-DIMENSIONAL BAR CODE SYMBOLS

[75] Inventors: Stephen J. Shellhammer, Lake Grove; Joseph Katz, Stony Brook; Ron Goldman, Westbury, all of N.Y.

[73] Assignee: Symbol Technologies, Inc., Bohemia, N.Y.

[21] Appl. No.: 327,531

[22] Filed: Oct. 19, 1994

[51] Int. Cl.⁶ ........................................ G06K 7/10
[52] U.S. Cl. ................................ 235/462; 235/472
[58] Field of Search ...................... 235/462, 461, 235/470, 472

[56] References Cited

U.S. PATENT DOCUMENTS

| | | | |
|---|---|---|---|
| 3,847,346 | 11/1974 | Dolch | 382/175 |
| 4,816,661 | 3/1989 | Krichever et al. | 235/472 |
| 5,126,544 | 6/1992 | Izumi | 235/462 |
| 5,138,140 | 8/1993 | Siemiatkowski et al. | 235/462 |
| 5,151,581 | 9/1992 | Krichever et al. | 235/467 |
| 5,235,167 | 8/1993 | Dvorkis et al. | 235/462 |
| 5,243,655 | 9/1993 | Wang et al. | 380/5 |
| 5,278,398 | 1/1994 | Pavlidis et al. | 235/462 |
| 5,304,786 | 4/1994 | Pavlidis et al. | 235/462 |
| 5,319,181 | 6/1994 | Shellhammer et al. | 235/462 |
| 5,369,265 | 11/1994 | Adachi | 235/462 |
| 5,378,881 | 1/1995 | Adachi | 235/462 |
| 5,414,250 | 5/1995 | Swartz | 235/462 |

*Primary Examiner*—Donald T. Hajec
*Assistant Examiner*—Karl D. Frech

[57] ABSTRACT

Disclosed are methods and apparatus for automatically aligning the field of view of a two dimensional bar code reading device with a randomly oriented two-dimensional bar code symbol wherein the symbol comprises a unique pattern located contiguously on at least one side thereof. One method is implemented in a laser based embodiment by scanning the symbol with a laser scan line extending through the border pattern (which is a PDF417 start codeword), measuring the length of the start codeword detected by the scan line, and rotating the laser scan line by a predetermined amount. This is repeated for a predetermined number of times, and the rotation angle at which the codeword length is smallest is determined by performing a least squares fit of the measured codeword lengths and rotation angles. The raster pattern is then rotated to the determined rotation angle so as to be aligned with the symbol for subsequent scanning and decoding. In the alternative, a sequential least squares fit can be performed after each start codeword measurement is made rather than waiting for all measurements to be made. An alternative embodiment implements a discrete radial CCD array comprised of linear CCD arrays which enables angular scanning of the target symbol, wherein a two-dimensional CCD array is then rotated either physically or logically by the calculated skew angle in order to be aligned with the symbol for imaging and subsequent processing and decoding.

27 Claims, 9 Drawing Sheets

METHOD AND APPARATUS TO SCAN RANDOMLY ORIENTED TWO-DIMENSIONAL BAR CODE SYMBOLS

BACKGROUND OF THE INVENTION

1. Field of the Invention

This invention relates generally to the optical scanning of two dimensional bar code symbols and in particular to the optical scanning of a randomly oriented two-dimensional bar code symbol by first determining the orientation oil the symbol with respect to the field of view of the scanning device and then rotating the field of view accordingly so as to be aligned substantially with the symbol for scanning and further processing and decoding.

2. Description of Related Art

Bar codes have become broadly accepted as a means for automatically identifying objects. A bar code symbol is a pattern of parallel bars and spaces of various widths that represent data elements or characters. The bars represent strings of binary ones and the spaces represent strings of binary zeros. Generally, the bars and spaces can be no smaller than a specified minimum width which is called a "module" or "unit." The bars and spaces are multiples of this module size or minimum width.

The conventional bar code symbol is "one-dimensional" in that the bars and spaces extend only in a single direction. There has been an increasing need, however, for machine-readable symbols that contain more information than conventional bar code symbols. One approach for increasing the information in machine-readable symbols is to reduce the height of the bar codes and stack the bar codes one on top of each other to create a "stacked" or "two-dimensional" bar code. One such two-dimensional bar code is PDF417, which was developed by Symbol Technologies, Inc. The PDF417 symbology utilizes a variable number of codewords which are discrete representations of data. A complete description of the PDF417 code is contained in U.S. Pat. No. 5,304,786, which is assigned to the same assignee as the present invention and which is incorporated by reference herein. Other two dimensional bar code symbologies include Code 1 and Maxicode, which are referred to as matrix codes.

Both one-dimensional and two-dimensional bar code symbols are typically read by optical scanning techniques, such as scanning laser beams, and the resulting electrical signals are then decoded to recover the data encoded in the symbol. In particular, two-dimensional bar code symbols such as those in the PDF417 symbology are advantageously scanned by a two-dimensional rastering laser pattern, which is comprised of a series of horizontal scans repeatedly swept in a vertical direction, as described in U.S. Pat. Nos. 4,816,661 and 5,235,167, which patents are assigned to the assignee of the present application and are incorporated by reference herein. When scanning and decoding a two-dimensional bar code symbol, however, the horizontal scan lines of the laser raster must be aligned substantially with the horizontal rows of the symbol, usually within ±3 as shown in FIG. 1A. In FIG. 1A, the laser scan lines 1 form a field of view and are parallel with the horizontally located rows of a PDF417 symbol 3, which will allow successful decoding (in practice, the laser scanning device generates many more closely spaced scan lines 1 than actually shown in FIG. 1A, which has been simplified for purposes of clear illustration).

In FIG. 1B, however, the symbol 3a is tilted with respect to the scan lines 1 in the field of view such that the symbol 3a cannot be successfully decoded. Although a two-dimensional bar code such as PDF417 allows some deviation, the orientation of the field of view 1 must still be less than some maximum angle relative to the rows of the symbol.

When using a hand-held laser rastering scanner, it is fairly simple for the operator to physically align the raster pattern in the field of view with the two-dimensional symbol by rotating the reader and/or the object bearing the symbol until the requisite alignment of the field of view is obtained visually and the symbol is successfully read and decoded. There are many applications, however, in which it is desirable to be able to read and decode a two-dimensional bar code symbol that may be randomly oriented without having to manually move the reader such that the field of view is aligned with rows of the symbol. For example, in an industrial environment, the symbol may be located on an object moving along a conveyor belt where the reader views the symbol from above. Thus, the symbol may be in any orientation relative to the field of view of the reader. In addition, in a retail point-of-sale environment, the symbol may be located on an item presented to a cashier for purchase. The cashier typically puts the item bearing the symbol under a presentation scan lamp, which provides the appropriate laser scanning pattern. In thus desirable in this situation to allow the cashier to quickly present the item under the scan lamp without having to align the symbol with the raster pattern.

Bar code symbol reading devices are also known in the art which are based upon charge coupled device (CCD) imaging technology. For example, a two dimensional CCD array comprised of 512×512 elements may be used to capture an image of the entire target bar code symbol simultaneously, and the electric charge stored in each element as a function of the amount of light sensed by an area covered by each element is shifted out serially to form electric signals for further processing, digitizing and decoding. Image processing techniques allow such a CCD array to be used to read misoriented bar code symbols. For example, U.S. Pat. No. 5,319,181, issued to the assignee of the present invention, describes a technique to implement a CCD camera to capture a PDF417 symbol, store the image data in memory, and perform virtual scanning of the image data to determine the proper orientation of the symbol and enable successful decoding. These techniques, while satisfactory in many applications, do not allow high speed reading since the image memory must be repeatedly accessed in a random access manner. There is thus a need in the art for CCD based bar code symbol reading devices to be able to perform high speed reading of misoriented two dimensional bar code symbols.

It is therefore an object of the present invention to provide a method and apparatus for reading and decoding a two-dimensional bar code symbol regardless of its orientation with respect to the field of view of the symbol reading device.

It is a further object of the present invention to be able to calculate the angle of skew of the misoriented bar code symbol with respect to the field of view of the reading device in order to correct for the misorientation by rotating the field of view to the calculated angle.

SUMMARY OF THE INVENTION

In accordance with these and other objects, provided is a method and apparatus for automatically aligning a field of view of a two-dimensional bar code symbol reading device with a randomly oriented two-dimensional bar code symbol, wherein the symbol comprises a unique locatable pattern located along at least one side thereof, the method comprising the steps of scanning the symbol with a scan line extending through the pattern, detecting the pattern, measuring the length of the pattern detected by the scan line, and rotating by a predetermined amount the scan line about a point central in the field of view. These scanning, detecting, measuring, and rotating steps are repeated for a predetermined number of times. The rotation angle at which the pattern length is smallest is determined as a function of the measured pattern lengths, and the field of view of the symbol reading device is rotated to the determined skew angle so as to be aligned with the symbol for subsequent scanning and decoding.

In the preferred embodiment, a rastering laser two dimensional bar code reading device is used and the scan line is generated by a laser light source which is swept across the target bar code by a scanning element such as an oscillating mirror or the like. When the angle of skew is determined, the field of view of the rastering device is rotated to that angle, and a laser raster pattern is generated which is accordingly aligned with the target symbol.

In an alternative embodiment, a two dimensional CCD reading device is used and the scan lines are generated by a dedicated radial shaped CCD array comprised of a plurality of linear CCD arrays configured in a radial pattern, wherein each the data captured by each line of the array is accessed in a serial fashion. Once the skew angle of the symbol is calculated, the two dimensional CCD array is rotated about its center to the calculated angle, and the entire image of the target bar code symbol may be captured simultaneously.

In either type of reading device, the method of the angle determination step comprises the step of performing a least squares fit of the measured pattern lengths and known rotation angles. In the alternative, the angle estimation step comprises the step of performing a sequential least squares fit of the measured codeword lengths and rotation angles.

DETAILED DESCRIPTION OF THE PREFERRED EMBODIMENTS

Reference will now be made in detail to the preferred embodiment of the invention, an example of which is illustrated in the accompanying drawings. The present invention is implemented advantageously in conjunction with a two dimensional bar code symbol having a well defined pattern that is capable of being readily located by the bar code reading device. As will be described herein, the PDF417 symbology features such a pattern in its start and stop codewords, which border the symbol contiguously on the left and right sides, respectively. Thus, the preferred embodiment of the present invention is advantageously implemented in conjunction with two-dimensional bar code symbols encoded in the PDF417 format, which is described herein.

Code PDF417

Each PDF417 symbol is composed of a stack of rows of bar-coded information. Each row in the symbol consists of a start pattern, several codewords, and a stop pattern. A codeword is the basic unit for encoding a value representing, or associated with, certain numbers, letters, or other symbols. Collectively, the codewords in each row form data columns.

Both the number of rows and the number of data columns of the PDF417 symbol are variable. The symbol must have at least three rows and may have up to ninety rows. Likewise, within each row, the number of codewords or data columns can vary from three to thirty.

Figure 2:
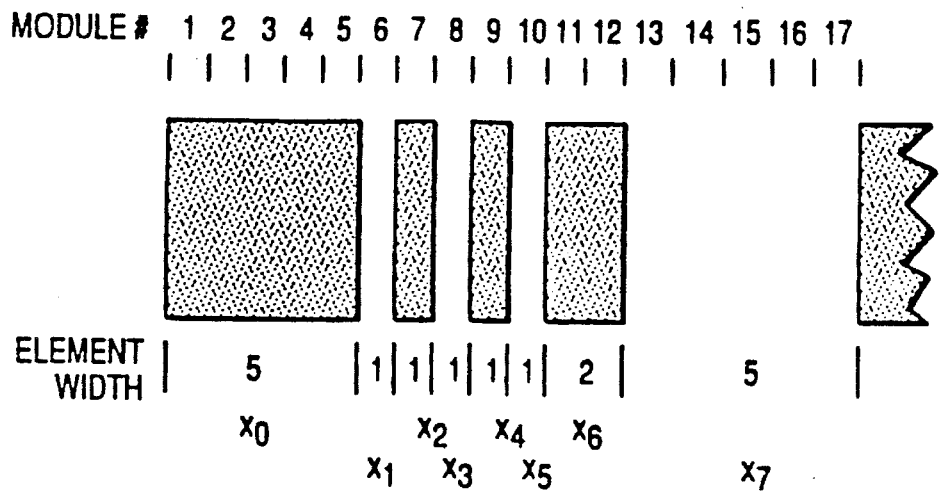
FIG. 2 is a diagram illustrating the modules and sequence of bars and spaces forming a codeword in the PDF417 format.

Each PDF417 codeword consists of seventeen nodules or units. There are four bars and four spaces in each codeword. Individual bars or spaces can vary in width from one to six modules, but the combined total per codeword is always seventeen modules. Thus, each codeword can be defined by an eight-digit sequence, which represents the four sets of alternating bar and space widths within the codeword. This is called the "X-sequence" of the codeword and may be represented by the sequence $X_0, X_1, \ldots X_7$. For example, for an X-sequence of "51111125", the first element is five modules wide, followed by five elements one module wide, one element two modules wide, and the last element five modules wide. This example is illustrated in FIG. 2.

Given the constraints that there are seventeen modules per codeword, that there are four bars and four spaces per codeword, and that individual bars and spaces can vary from one to six modules, there are 10,480 unique codewords possible. This set of possible codewords is further partitioned into three available mutually exclusive subsets called "clusters." In the PDF417 symbol, each row uses only one of the three clusters to encode data, and each cluster repeats sequentially every third row. Because any two adjacent rows use different clusters, the decoder is able to discriminate between codewords from different rows within the same scan line.

The cluster number of a codeword may be determined from its X-sequence using the following formula:

$$\text{cluster number} = (X0-X2+X4-X6) \mod 9$$

where "mod 9" is the remainder after division by nine. Referring to the codeword in FIG. 2, the cluster number is calculated as follows:

$$\text{cluster} = (5-1+1-2) \mod 9 = 3$$

To minimize error probabilities, PDF417 uses only three clusters, even though nine are mathematically possible. Thus, each row uses only one of the clusters 0, 3, or 6, to encode data, with the same cluster repeating sequentially every third row. Row 0 codewords, for example, use cluster 0, row 1 uses cluster 3, and row 2 uses cluster 6, etc. In general, the cluster number may be determined from the row number as follows:

$$\text{cluster number} = ((\text{row number}) \mod 3) * 3$$

There are 929 codeword values defined in PDF417. These values are 0 through 928. Each cluster presents the 929 available values with distinct bar-space patterns so that one cluster cannot be confused with another.

Figure 3:
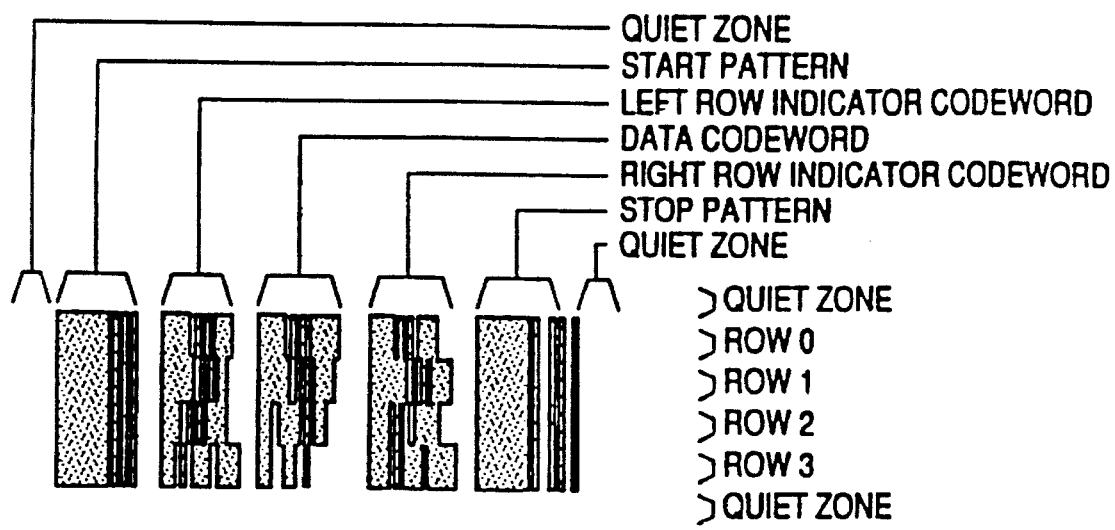
FIG. 3 is a block diagram showing the overall structure of a PDF417 symbol.

FIG. 3 is a block diagram showing the overall structure of a PDF417 symbol. Each row of the symbol consists of a start pattern, a left row indicator codeword, one or more data codewords, a right row indicator codeword, and a stop pattern. The minimum number of codewords in a row is three, including the left row indicator codeword, at least one data codeword, and the right row indicator codeword. The right and left row indicator codewords help synchronize the structure of the symbol.

The start and stop patterns identify where each row of the symbol begins and ends. Advantageously for implementation with the present invention, PDF417 uses unique start and stop patterns. The start pattern, or left side of each row, has the unique pattern, or X-sequence, of "81111113". The stop pattern, or right side of each row, has the unique X-sequence of "71131121". Since the start and stop patterns are the same for each row, these patterns form solid "structures" on the left and right sides of the symbol, respectively (as shown in FIG. 3). The entire symbol is surrounded by clear spaces or "quiet zones" which contain no dark marks.

Further details regarding the PDF417 symbology may be found in U.S. Pat. No. 5,304,786, which is incorporated by reference herein.

It is the uniqueness of the start and stop codewords and their visual contiguousness along the vertical dimension of the PDF417 symbol which facilitate the method of the present invention. Thus, as will be evident, the present invention is well suited to determine the skew angle for any symbology or graphic which is surrounded by a similarly unique start and/or stop pattern.

Symbol Angle Determination

Figure 1A:
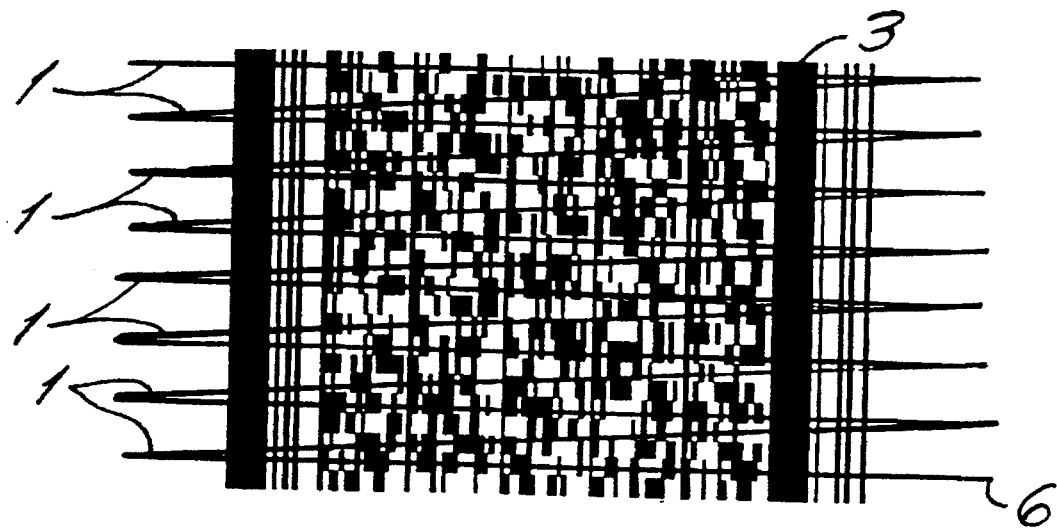
FIG. 1A is an illustration of a PDF417 bar code symbol being scanned by a laser raster pattern which is aligned with the horizontal rows of the symbol.
Figure 1B:
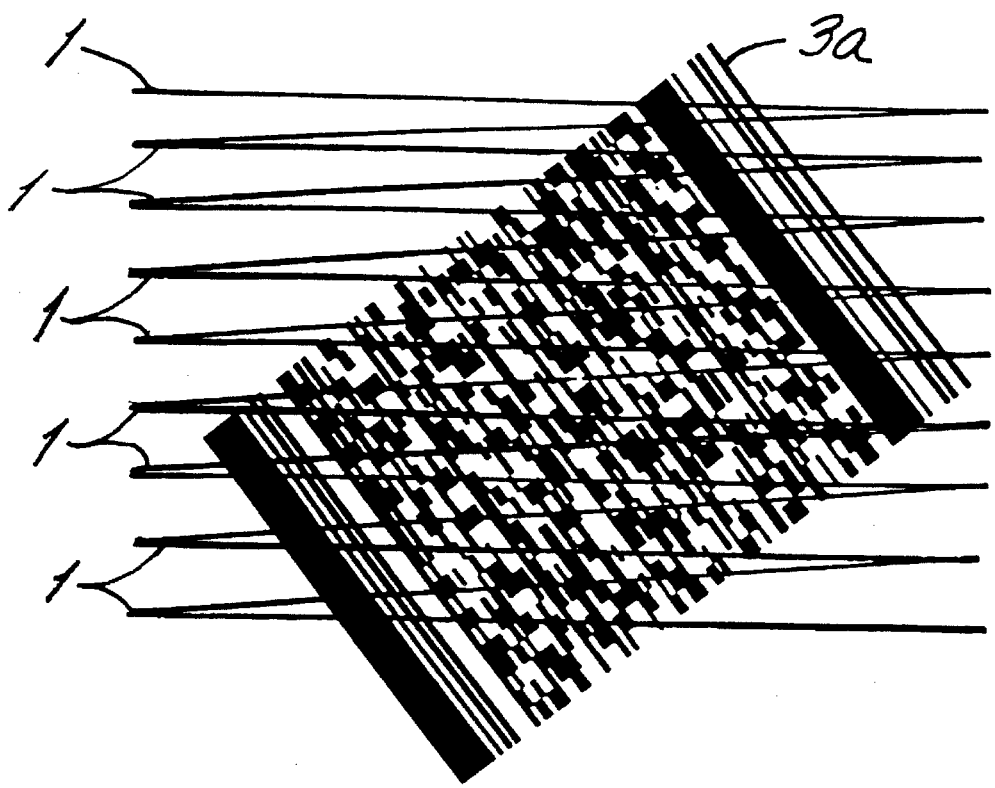
FIG. 1B is an illustration of a PDF417 label being scanned by a laser raster pattern which is tilted with respect to the horizontal rows of the symbol.
Figure 4:
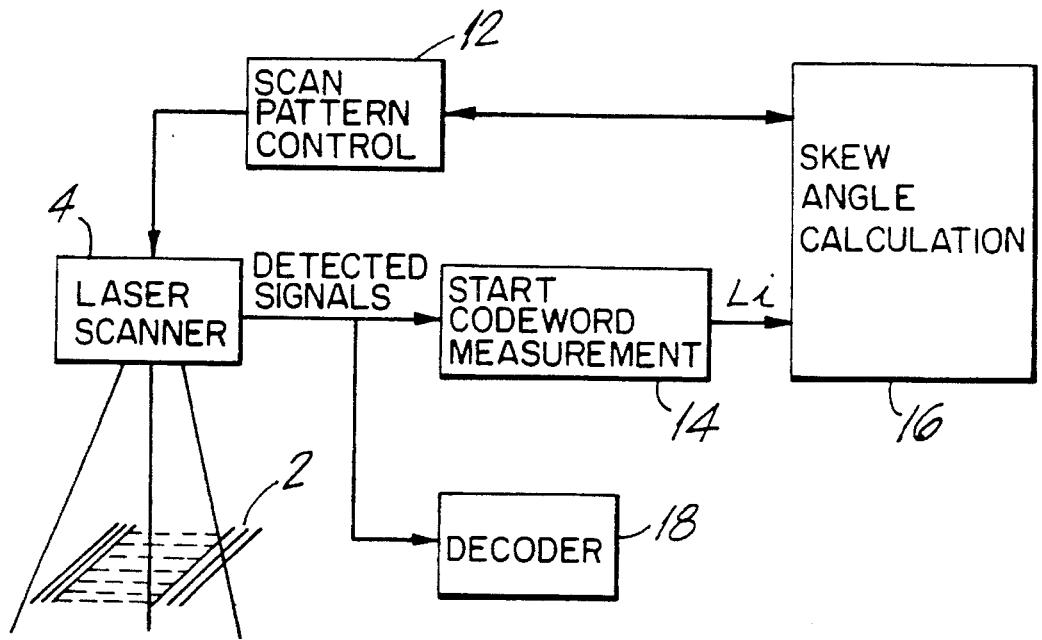
FIG. 4 is a functional block diagram of the preferred embodiment of the present invention which utilizes a rotating series of laser scan lines.

Referring to the preferred embodiment illustrated in FIG. 4, an object bearing a PDF417 symbol 2 is placed under a presentation-type laser scan lamp 4 for scanning and decoding. The scan lamp 4 produces a laser raster pattern 6 as shown in FIG. 1A. The alignment of the field of view of the raster pattern 6 may be rotated by the laser scanner 4 as desired, but is initially set to an arbitrary but predetermined angle with respect to the target area. The field of view of a rastering laser scanner is the area over which the raster pattern scans.

Typically, in the laser scanner 4, a laser beam is generated and reflected off of scanning optics such as an oscillating mirror, the motion of which is controlled by scan pattern control means 12 to generate the desired pattern. In the preferred embodiment, the laser raster pattern is generated by any means known in the art; for example, U.S. patent application Ser. No. 08/153,053, owned by the assignee of the present invention and which is incorporated by reference herein, discloses various means of generating scan patterns for laser bar code readers which can be controlled as desired.

Figure 5:
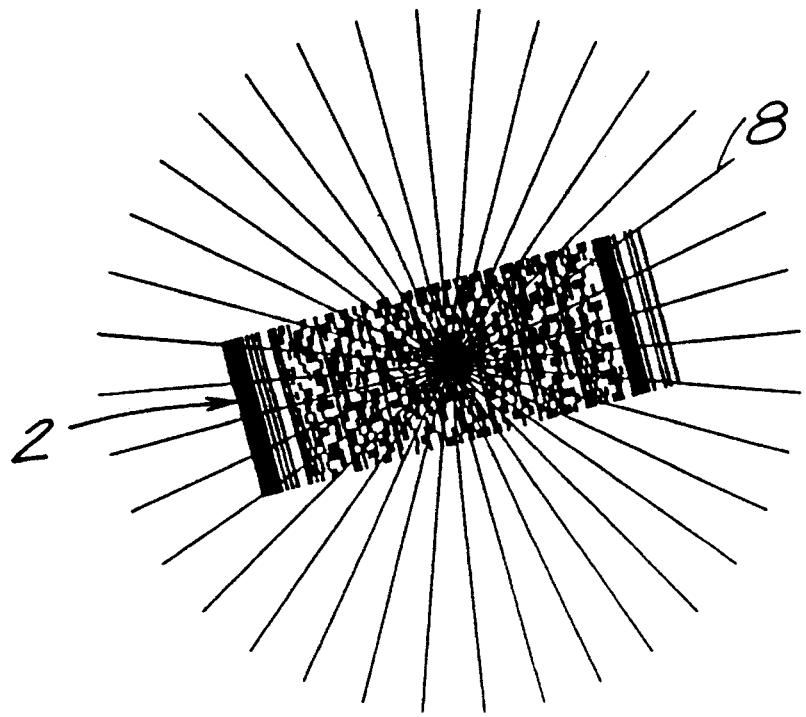
FIG. 5 is an illustration of a PDF417 symbol being scanned by a series of laser scan lines rotated at incrementally increasing angles.

The PDF417 symbol 2 is placed under the scan lamp 4 in the middle of the field of view, at any random orientation angle with respect to the raster pattern 6. The scan lamp 4 operates in a pattern that is designed to decode conventional one dimensional bar codes at any orientation. If in this mode of operation a PDF417 start or stop character is detected (an X-sequence of "81111113" or "71131121"), the scan lamp 4 switches into an angle determination mode in accordance with the present invention. In this mode of operation a single high speed scan line 8 is rotated in fixed angular increments, typically 5°. FIG. 5 shows a typical PDF417 symbol with a number of scan lines 8 at fixed angular increments.

A single cross section of the symbol is obtained from each single scan line 8. The PDF417 symbol cannot be distinguished from other graphics if the scan line 8 is not aligned with the horizontal rows of the symbol 2. However, the PDF417 start and stop codewords are unique and can be detected at an angle in excess of 45°. Thus, the information available to determine the rotation angle of the symbol 2 may be found in the start and stop codewords. The information that is available from the start codeword is: the length of the codeword, the distance from the beginning of the scan to the start codeword, and whether the start codeword was scanned in either the forward or reverse direction. The stone information is available about the stop codeword.

The detected signals from the laser scanner 4 are input into start codeword measurement means 14, which measures the length $L_i$ of the start codeword. $L_i$ is used by the skew angle calculation means 16 to determine the skew angle in accordance with the present invention as will be described below. Once the skew angle is determined, the scan pattern control means 12 is instructed to generate a raster pattern and rotate it accordingly for subsequent reading and decoding of the bar code symbol 2. The start codeword measurement means 14 and the skew angle calculation means 16 may be advantageously implemented, in accordance with the calculation methods to be described below, by any appropriate computing means known in the art such as a general purpose microprocessor with supporting circuitry such as a math coprocessor.

Figure 6:
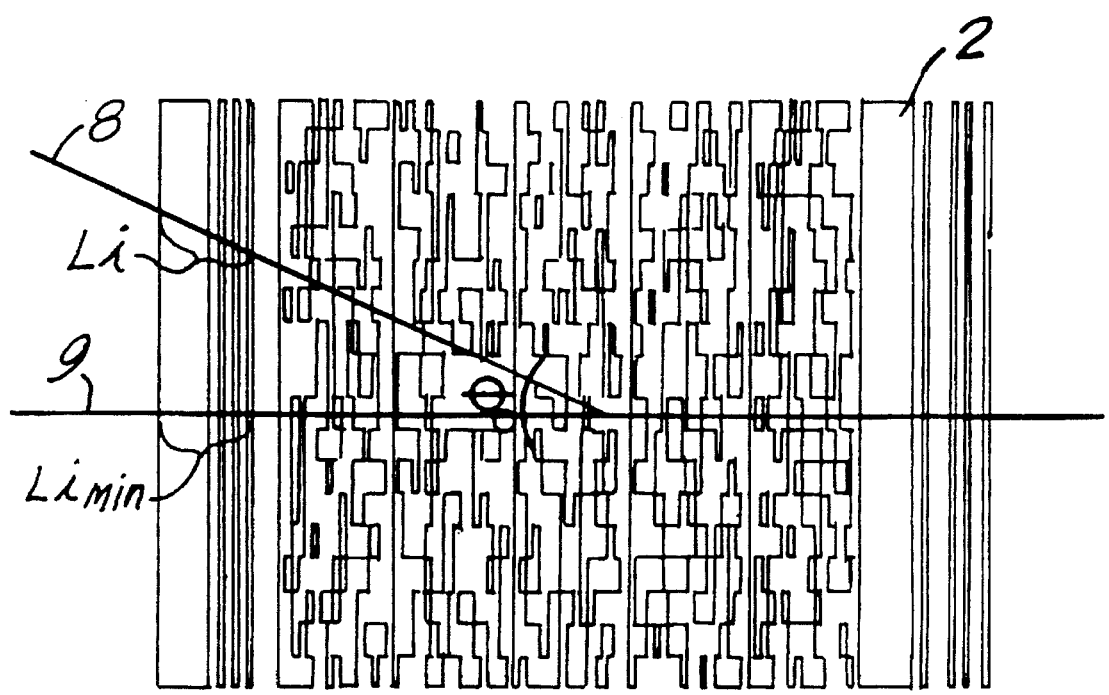
FIG. 6 is an illustration of the codeword length and angle parameters implemented by the method of the present invention.

Referring to FIG. 6, the length of the start codeword is used in the present invention to determine the skew angle of the symbol 2. The length of the start codeword is at a minimum when the scan line 8 is aligned with the rows 9 of the symbol 2 and it increases as the angle between the scan line 8 and the rows of the symbol 2 increases. The length of the scan line 8 through the start codeword is proportional to $\cos(\theta_0)^{-1}$, where $\theta_0$ is the angle between the scan line 8 and the rows of the symbol 2.

Two alternative methods can be implemented in the present invention in order to determine the skew angle of the symbol. The first method rotates a scan line in fixed angular increments, collects all the measurement data of the start codeword, and estimates the rotation angle of the symbol with a least square fit of a second order polynomial to the measured start codeword lengths. Once the polynomial has been found, the angle at which the polynomial is at a minimum is the estimate of the symbol rotation angle. The second method of the present invention, which is preferred due to a faster angle calculation time, uses a sequential least square fit in which an estimate is updated each time a new start codeword measurement is made. In both cases, the skew angle is used to rotate the raster pattern so as to be aligned with the symbol for subsequent reading and decoding.

Reference is made herein to *Parameter Estimation: Principles and Problems* (1980), H. W. Sorenson, in establishing the use of the least squares fit and sequential least squares fit of the present invention, which text is incorporated by reference herein.

Figure 7:
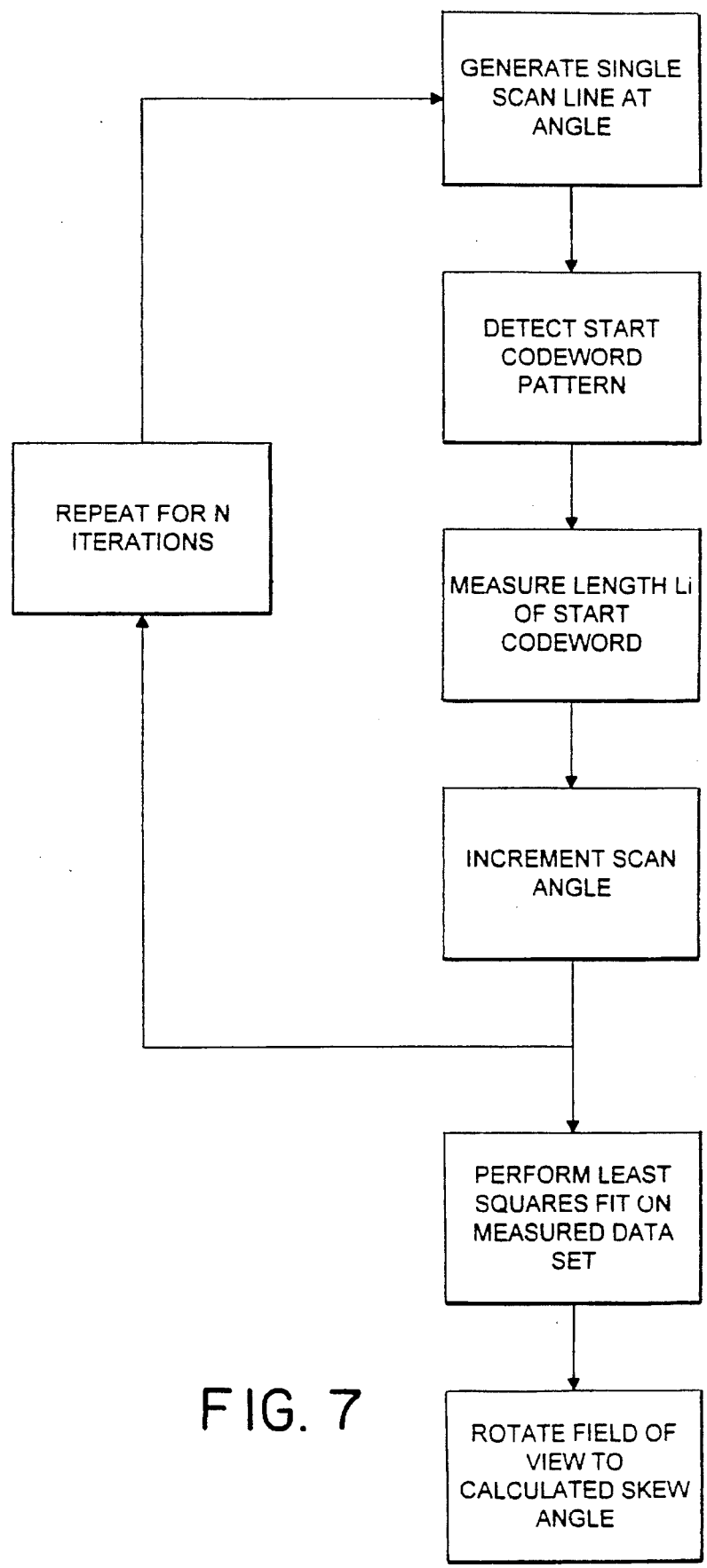
FIG. 7 is a flowchart of a first method of the present invention for aligning a field of view with a two-dimensional symbol.

Referring to the flowchart in FIG. 7, the first method, which utilizes all the measurement data prior to performing any calculations, operates as follows. $L_i$ is the length of the start codeword at the scan angle $\theta$. Then the observation equation is:

$$a\theta_i^2 + b\theta_i + c = L_i \tag{1}$$

where a, b, and c are the parameters of the second order polynomial that must be solved. This observation equation can be put in matrix notation, $$(\theta_i^2 \; \theta_i \; 1) \begin{pmatrix} a \\ b \\ c \end{pmatrix} = L_i. \tag{2}$$

If N observations are made, we can form the following matrix equation combining all the observations:

$$\begin{pmatrix} \theta_1^2 & \theta_1 & 1 \\ \theta_2^2 & \theta_2 & 1 \\ \theta_3^2 & \theta_3 & 1 \\ & \cdot & \\ & \cdot & \\ & \cdot & \\ \theta_N^2 & \theta_N & 1 \end{pmatrix} \begin{pmatrix} a \\ b \\ c \end{pmatrix} = \begin{pmatrix} L_1 \\ L_2 \\ L_3 \\ \cdot \\ \cdot \\ \cdot \\ L_N \end{pmatrix} \tag{3}$$

which can be written as $$Ax = y \tag{4}$$

where $$A = \begin{pmatrix} \theta_1^2 & \theta_1 & 1 \\ \theta_2^2 & \theta_2 & 1 \\ \theta_3^2 & \theta_3 & 1 \\ & \cdot & \\ & \cdot & \\ & \cdot & \\ \theta_N^2 & \theta_N & 1 \end{pmatrix}$$

$$x = \begin{pmatrix} a \\ b \\ c \end{pmatrix}$$

$$y = \begin{pmatrix} L_1 \\ L_2 \\ L_3 \\ \cdot \\ \cdot \\ \cdot \\ L_N \end{pmatrix}$$

The least squares estimate $\hat{x}$ of the parameters of the quadratic equation is given by:

$$\hat{x} \stackrel{\Delta}{=} \begin{pmatrix} \hat{a} \\ \hat{b} \\ \hat{c} \end{pmatrix} = (A^T A)^{-1} A^T y. \tag{5}$$

Once the value of $\hat{x}$ has been found, the angle at which the quadratic formula is a minimum is an estimate of the label rotation angle $$\hat{\theta} = \frac{-\hat{b}}{2\hat{a}}. \tag{6}$$

Least squares is an excellent method of estimating x, however, it requires collecting all the observations before any calculations can be performed and it involves inversion of a N×N dimensional symmetric matrix. There exist in the prior art many methods of solving this type of equation, but for a large value of N the time required can be long and no calculations can begin until all the observations have been made.

Figure 8:
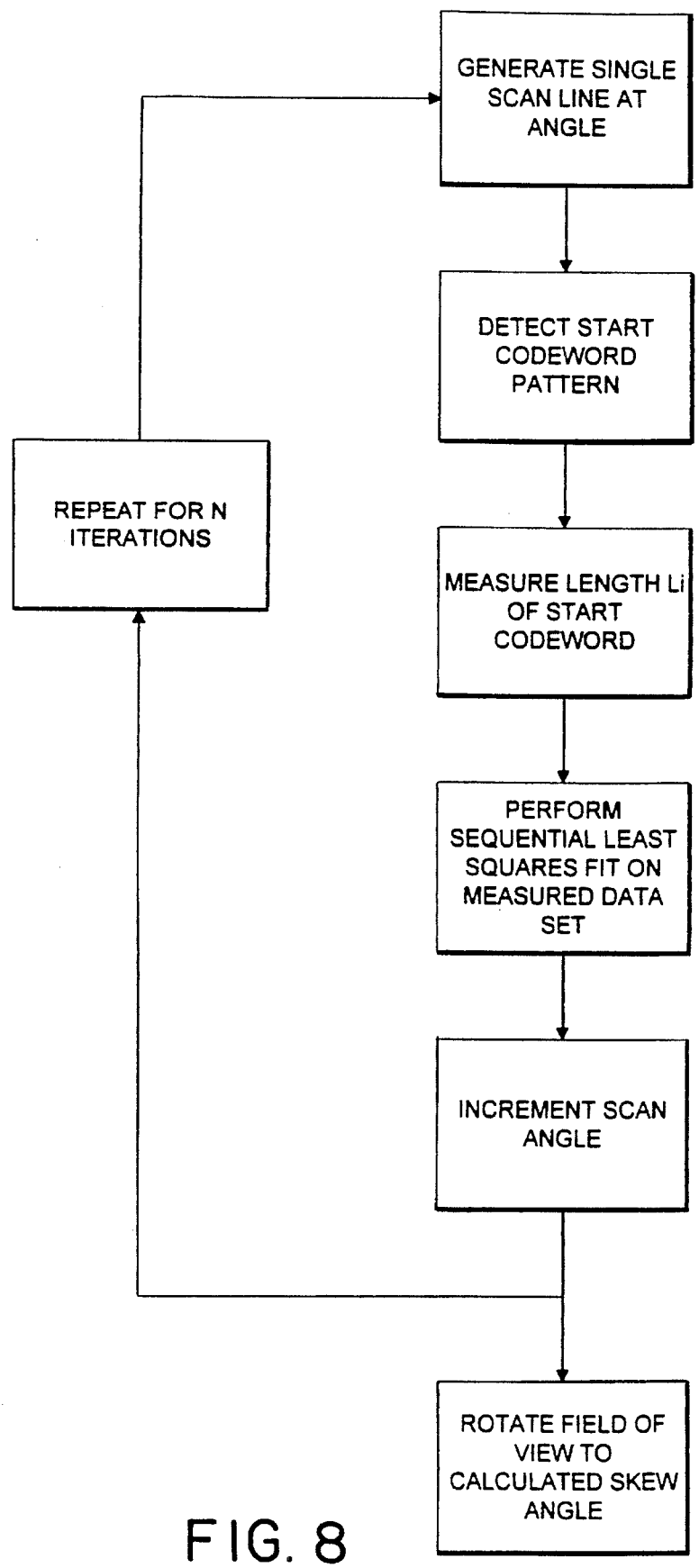
FIG. 8 is a flowchart of a second method of the present invention for aligning a field of view with a two-dimensional symbol.

In the alternative, to avoid having to wait until all the observations have been made until any calculations can be performed, one can use the method of sequential least squares whereby an estimate is updated every time a new measurement is made. Referring to the flowchart in FIG. 8 the measurement equation at each observation is:

$$L_i = H_i x + v \tag{7}$$

where $L_i$ is the observed start codeword length, the observation vector is $H_i = (\theta_i^2 \; \theta_i \; 1)$ and v is the random error in the observation. The set of equations for performing the sequential least squares estimation are given in the Sorenson reference. The gain matrix is given by $$K_k = P_k H_k^T r_k^{-1} \tag{8}$$

where $P_k$ is the covariance matrix of the estimate of x, at step k. The scalar $r_k$ is the variance of v. The estimate of x, at step k, is given by $$\hat{x}_k = \hat{x}_{k-1} + K_k[L_k - H_k \hat{x}_{k-1}] \tag{9}$$

and its covariance is $$P_k = P_{k-1}[I - H_k^T (H_k P_{k-1} H_k^T + r_k)^{-1}] H_k P_{k-1}. \tag{10}$$

These matrix equations are easier to solve than (5) and since $L_i$ is a scalar there is no need to invert any matrices; the inversions in (8) and (10) are for scalars. Also, these three equations can be performed each time a new observation is made and once all the observations are made the estimate of x is complete and one does not have to spend time solving (5). Then x̂ is used to find $\hat{\theta}_o$ using (6).

Once the skew angle has been calculated, the field of view of the laser raster pattern is rotated to this angle so as to be aligned with the symbol, and the symbol is read and decoded in accordance with methods well known in the art.

As is clear from the above description, the present invention is applicable to rotating a raster pattern for reading and decoding any graphic or indicia which is defined by a unique pattern contiguous along at least one side thereof. Once the start pattern is detected and measured throughout a plurality of scan lines as described, the angle of rotation can be ascertained in accordance with the present invention and the raster pattern can be rotated accordingly.

An alternative mode of reading bar code symbols is by the use of CCD image sensor arrays. As is known in the art, CCD sensor arrays are used to capture the images of the target symbol wherein each CCD element of the array (each pixel) senses the amount of light reflected off of a discrete area of the target symbol which is mapped to that element. A linear array (e.g. 1024 or 2048 pixels in a single line) is capable of imaging a linear bar code, wherein the entire bar code image is sampled at once by the linear array and shifted electronically to processing and decoding circuitry means. Similarly, a two dimensional array (e.g. 512 by 512 pixels) can capture a two dimensional symbol, and each row of the array is shifted out one at a time to image processing circuitry means which is known in the art.

Figure 9:
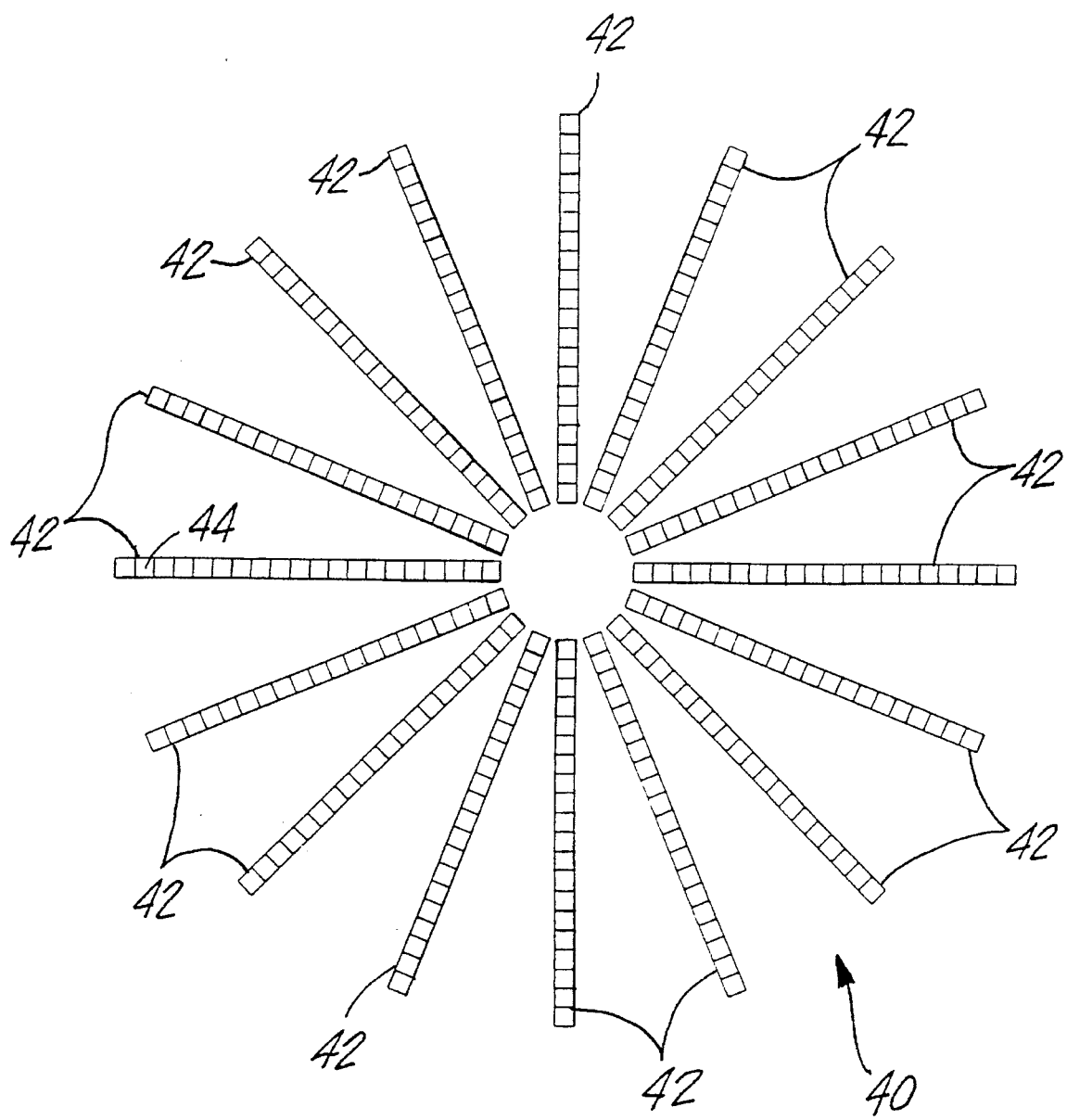
FIG. 9 is an illustration of a radial CCD array comprised of linear arrays radiating outwardly from a central point in order to obtain scan lines at incrementally increasing angles in accordance with an alternative embodiment of the invention.

The rotating scan lines of the present invention can be implemented using CCD imaging technology by fabricating a dedicated radial CCD array 40 as shown in FIG. 9. The radial CCD array 40 is comprised of a plurality of linear CCD arrays 42 arranged in a radial pattern at small angular increments with respect to each other. In the preferred embodiment, seventy two such linear arrays 42 will comprise the radial array 40, each at 5° angular increments (for clear illustrative purpose, the radial array 40 shown in FIG. 9 comprises only sixteen linear arrays 42 at 22.5° increments).

Figure 10:
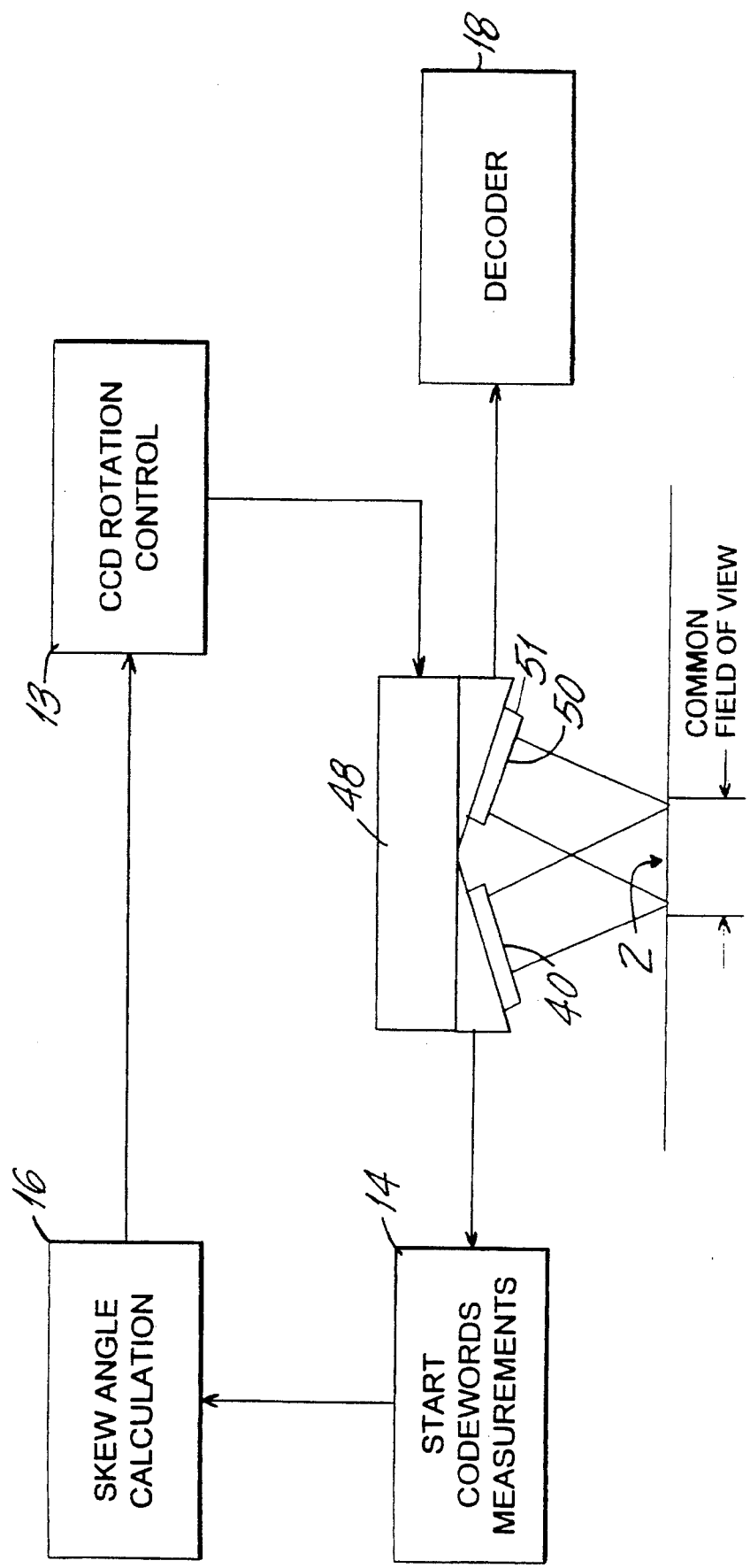
FIG. 10 is a functional block diagram of an alternative embodiment of the present invention which utilizes the radial CCD array of FIG. 9.
Figure 11:
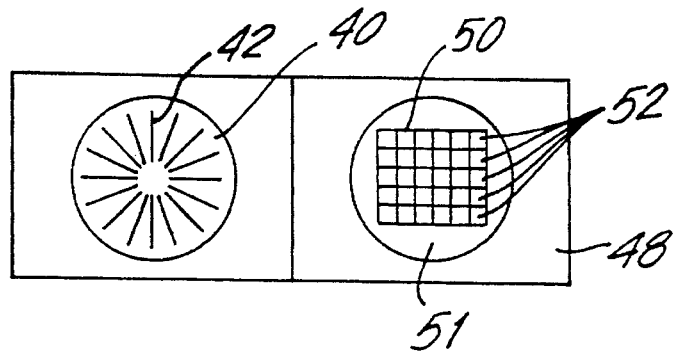
FIG. 11 is an illustration of a mounting plate used to hold the radial CCD array of FIG. 9 and a two dimensional CCD array for image capture.

Each linear array 42 can be accessed individually by addressing the array 42 and shifting data out in a manner well known in the art. The radial CCD array 40 is located over a target area so that its field of view encompasses the target bar code symbol 2, as shown in FIG. 10. A two dimensional CCD array 50 is mounted on a rotating turntable 51, which is rotatably mounted in a housing 48. The radial array 40 and the two dimensional array 50 are positioned at a slight angle towards each other such that the field of view of each intersects at a common plane, which coincides with the location of the target bar code symbol 2. Thus, each of the radial array 40 and the two-dimensional array 50 can view the target symbol 2 simultaneously. A plan view of the bottom of the housing 48 is shown in FIG. 11, which shows the juxtaposition of the radial array 40 and the two dimensional array 50 as mounted on the turntable 51.

The CCD based system of FIG. 10 operates in the same fashion as that described in FIG. 4 for the laser raster based embodiment of the present invention, with the following differences. The radial CCD array 40 captures that portion of a randomly oriented two dimensional bar code symbol 2 to which the elements 44 are mapped in its field of view. Each linear array 42 is then accessed by appropriate circuitry well known in the art. The PDF417 start codewords are detected for each radial scan and the skew angle is calculated as described above in conjunction with the laser-based embodiment. A CCD rotation control block 13 then sends appropriate electrical signals to the housing 48 in order to rotate the disc 51 about its center by the calculated skew angle such that the horizontal rows 52 of the two dimensional array 50 are substantially aligned with the horizontal rows of codewords in the two dimensional bar code symbol 2 within the field of view. The two dimensional CCD array 50 then captures a properly aligned image of the two dimensional symbol 2 and the image is processed and decoded by the decoder 18 accordingly by means well known in the art.

In an alternative embodiment, the CCD array 50 is "rotated" or imaged logically rather than physically. The two dimensional array 50 remains stationary and captures the randomly oriented symbol 2 at the same time as the radial array 40. Each linear array 42 of the radial array 40 is accessed, the PDF417 start codewords are detected for each radial scan and the skew angle is calculated as described above. This information is then provided to the decoder 18, which can then execute an imaging process or "virtual scan" of the misaligned symbol 2 as described in U.S. Pat. No. 5,319,181, which patent is incorporated by reference herein.

Figure 12:
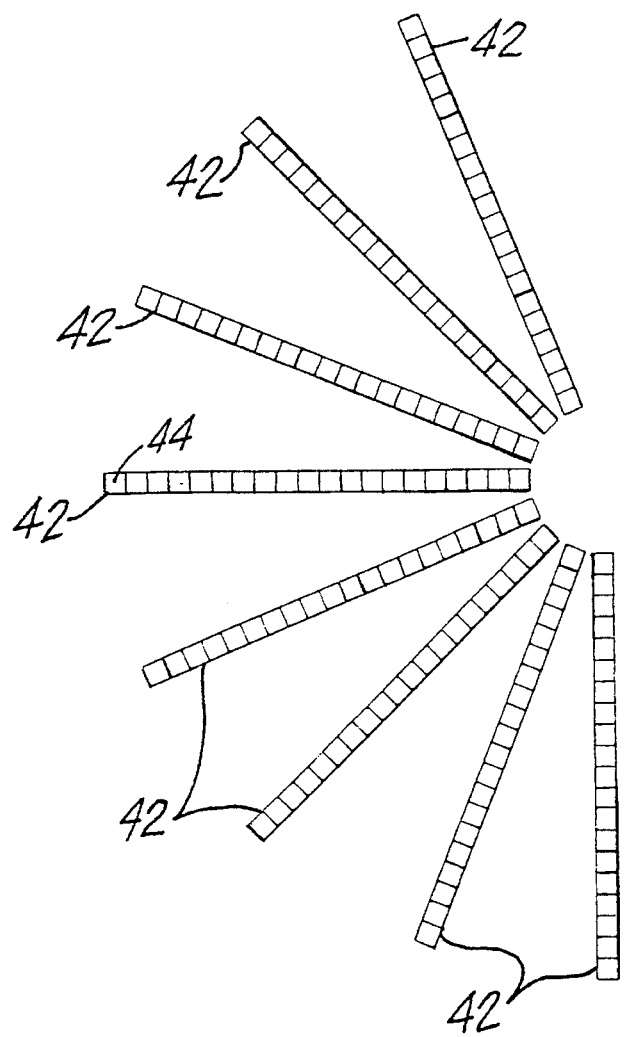
FIG. 12 is an alternative embodiment of the radial array of FIG. 9.

Although the illustrative embodiments presented herein implement a radial CCD array 40 having linear arrays 42 arranged in a full 360° layout, it is understood that alternate arrangements may also be implemented which take advantage of the symmetry of a target symbol such as a PDF417 symbol. Thus, a semicircular shaped array 43 as shown in FIG. 12 is contemplated by the present invention, which will capture either a PDF417 start codeword or stop codeword. Since the start and stop codewords are unique, the system will ascertain the skew angle with the same accuracy as the full circular embodiment described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method of automatically aligning a field of view of a two dimensional bar code symbol reading device with a randomly oriented two dimensional bar code symbol, wherein said symbol comprises a unique pattern located contiguously along at least one side thereof, said method comprising the steps of:

(a) scanning said symbol with a linear scan extending through said pattern;

(b) detecting the presence of said pattern;

(c) measuring the length of said pattern detected by said linear scan;

(d) rotating the linear scan by a predetermined angle about a central point;

(e) repeating steps (a) through (d) a predetermined number of times;

(f) determining the rotation angle at which the pattern length is smallest as a function of the measured pattern lengths; and (g) rotating the field of view of the reading device to the determined rotation angle so as to be aligned with the bar code symbol for subsequent scanning and decoding.

2. The method in claim 1 in which angle determination step comprises the step of performing a least squares fit of the measured pattern lengths and known rotation angles.

3. The method of claim 2 in which the two-dimensional bar code symbol is in the PDF417 format.

4. The method of claim 3 in which the linear scanning steps are performed with a sweeping laser beam.

5. The method of claim 4 further comprising the step of scanning the bar code symbol with a rastering laser pattern.

6. The method of claim 3 in which the linear scanning steps are performed with a series of linear CCD arrays arranged in a radial formation.

7. The method of claim 6 further comprising the step of reading the bar code symbol with a two dimensional CCD array.

8. The method of claim 7 in which the series of linear CCD arrays arranged in a radial formation form a substantially 360° array.

9. The method of claim 7 in which the series of linear CCD arrays arranged in a radial formation form a substantially 180° array.

10. A method of automatically aligning a field of view of a two dimensional bar code symbol reading device with a randomly oriented two dimensional bar code symbol, wherein said bar code symbol comprises a unique pattern located contiguously along at least one side thereof, said method comprising the steps of:

(a) scanning said symbol with a linear scan extending through said pattern;

(b) detecting the presence of said pattern;

(c) measuring the length of said pattern detected by said linear scan;

(d) estimating the rotation angle at which the pattern length is smallest as a function of the measured pattern lengths;

(e) rotating the linear scan line by a predetermined angle about a central point;

(f) repeating steps (a) through (e) a predetermined number of times; and (g) rotating the field of view of the reading device to the determined rotation angle so as to be aligned with the bar code symbol for subsequent scanning and decoding.

11. The method in claim 10 in which angle estimation step comprises the step of performing a sequential least squares fit of the measured pattern lengths and known rotation angles.

12. The method of claim 11 in which the two-dimensional bar code symbol is in the PDF417 format.

13. The method of claim 12 in which the linear scanning steps are performed with a sweeping laser beam.

14. The method of claim 13 further comprising the step of scanning the bar code symbol with a rastering laser pattern.

15. The method of claim 12 in which the linear scanning steps are performed with a series of linear CCD arrays arranged in a radial formation.

16. The method of claim 15 further comprising the step of reading the bar code symbol with a two dimensional CCD array.

17. The method of claim 16 in which the series of linear CCD arrays arranged in a radial formation form a substantially 360° array.

18. The method of claim 16 in which the series of linear CCD arrays arranged in a radial formation form a substantially 180° array.

19. A device for scanning a two dimensional bar code symbol which may be randomly oriented at an unknown angle of skew with respect to a field of view of said device, said two dimensional bar code symbol comprising a unique pattern located contiguously along at least one side thereof, wherein said device comprises:

(a) means for generating a plurality of scan lines, wherein each of said scan lines is rotated by a predetermined angle about a central point, and wherein at least some of said scan lines intersect with said pattern;

(b) means for measuring the lengths of the pattern intersected by each of said scan lines;

(c) means for calculating as a function of the measured lengths of said pattern the angle of skew of the bar code symbol with respect to the field of view of the reading device;

(d) means for rotating the field of view of the reading device to the calculated angle of skew such that the field of view is substantially aligned with the two dimensional bar code symbol; and (e) means for scanning the two dimensional bar code symbol.

20. The device of claim 19 in which said means for generating a plurality of scan lines comprise:

(i) a laser light source,
(ii) means for sweeping light from said laser light source across said bar code symbol; and
(iii) means for rotating the orientation of said sweeping means such that subsequent sweeps are rotated by a predetermined amount around a central point; and wherein said means for scanning said two dimensional bar code symbol comprises a two dimensional laser raster.

21. The device of claim 20 in which said calculating means comprises means for performing a least squares fit of the measured pattern lengths and predetermined rotation angles.

22. The device of claim 20 in which said calculating means comprises means for performing a sequential least squares fit of the measured pattern lengths and predetermined rotation angles.

23. A device for scanning a two dimensional bar code symbol which may be randomly oriented at an unknown angle of skew with respect to a field of view of said device, said two dimensional bar code symbol comprising a unique pattern located contiguously along at least one side thereof, wherein said device comprises:

(a) a two-dimensional CCD array defining the field of view of the device;

(b) a radial CCD matrix comprising a plurality of linear CCD arrays arranged in a radial pattern emanating from a central point and at predetermined angles, wherein each of said linear CCD arrays is separately addressable, and wherein at least some of said linear CCD arrays image said contiguous symbol pattern;

(c) means for measuring the lengths of the portions of said contiguous symbol pattern imaged by each of said linear CCD arrays;

(d) means for calculating as a function of the measured lengths of said contiguous symbol pattern the angle of skew of the two dimensional bar code symbol with respect to the field of view of the reading device;

(e) means for rotating the two dimensional CCD array to the calculated angle of skew such that the two dimensional CCD array is substantially aligned with the two dimensional bar code symbol; and (f) means for scanning the two dimensional bar code symbol with the two dimensional CCD array.

24. The device of claim 23 in which the calculating means implements a least squares fit of the measured pattern lengths and known rotation angles.

25. The device in claim 23 in which the calculating means implements a sequential least squares fit of the measured pattern lengths and known rotation angles.

26. The device of claim 25 in which the radial CCD matrix forms a substantially 360° array.

27. The device of claim 25 in which the radial CCD matrix forms a substantially 180° array.

* * * * *